(12) United States Patent
Oberti et al.

(10) Patent No.: US 7,703,583 B2
(45) Date of Patent: Apr. 27, 2010

(54) VENTILATED DISC BRAKING BAND FOR A DISC BRAKE

(75) Inventors: Leone Oberti, Lenna (IT); Antonio Quarti, Alme' (IT)

(73) Assignee: Freni Brembo S.p.A., Curno (IT)

( * ) Notice: Subject to any disclaimer, the term of this patent is extended or adjusted under 35 U.S.C. 154(b) by 581 days.

(21) Appl. No.: 10/556,502

(22) PCT Filed: May 15, 2003

(86) PCT No.: PCT/IT03/00293

§ 371 (c)(1), (2), (4) Date: Jun. 20, 2006

(87) PCT Pub. No.: WO2004/102029

PCT Pub. Date: Nov. 25, 2004

(65) Prior Publication Data

US 2006/0243546 A1    Nov. 2, 2006

(51) Int. Cl.
*F16D 65/12* (2006.01)
(52) U.S. Cl. .................. 188/218 XL; 188/264 A
(58) Field of Classification Search .......... 188/218 XL, 188/264 A, 264 AA, 264 R
See application file for complete search history.

(56) References Cited

U.S. PATENT DOCUMENTS 4,488,074 A * 12/1984 Marandet ............. 188/218 XL
4,865,167 A * 9/1989 Giorgetti et al. ...... 188/218 XL
5,542,503 A * 8/1996 Dunn et al. ........... 188/218 XL
6,161,661 A * 12/2000 Pahle et al. ........... 188/218 XL
6,405,839 B1* 6/2002 Ballinger et al. ...... 188/218 XL
7,066,306 B2* 6/2006 Gavin ................... 188/218 XL
7,261,192 B2* 8/2007 Khambekar et al. ... 188/218 XL
2002/0166738 A1* 11/2002 Gavin ................... 188/218 XL

FOREIGN PATENT DOCUMENTS

| DE | 4210449 A1 | * | 10/1993 |
| DE | 93 19 490 U | | 3/1994 |
| DE | 4400898 C1 | * | 3/1995 |
| GB | 2060796 A | * | 5/1981 |
| WO | WO0238978 A1 | * | 5/2002 |
| WO | WO 02/081940 A | | 10/2002 |
| WO | WO 03/002886 A | | 1/2003 |

OTHER PUBLICATIONS

International Search Report dated Dec. 3, 2003 for International Application No. PCT/IT2003/00293.

* cited by examiner

*Primary Examiner*—Thomas J Williams
(74) *Attorney, Agent, or Firm*—Hogan & Hartson

(57) ABSTRACT

A braking band of a disc for a disc brake of the ventilated type, unusually capable of improving the disc cooling efficiency, extends between an inner diameter close to an axis of rotation of the disc and an outer diameter away from the said axis of rotation of the disc. The braking band may have two leaves defining an intermediate space and joined by a connection. The ratio between the outer diameter of the surface and the thickness or maximum dimension of the said intermediate space between the two leaves measured in a direction parallel to the axis of the disc may be between 15 and 32.

26 Claims, 9 Drawing Sheets

VENTILATED DISC BRAKING BAND FOR A DISC BRAKE

This invention relates to a braking band for a disc brake of the ventilated type.

As is known, discs for disc brakes comprise a hub from which there extends an annular portion known as the braking band which is designed to act together with the pads of a clamp. In the case of discs of the ventilated type, the braking band is constructed from two leaves facing each other and connected together by connection means, for example in the form of posts or fins. The outer surfaces of the two leaves define opposite braking surfaces while the inner surfaces, together with the posts or fins bound ventilation ducts for cooling the disc through which air flows in a centrifugal direction while the disc is in rotary motion.

It is known that the braking force exerted by the pads against the braking band of the disc generates heat, and as a consequence brings about an increase in temperature sufficient to render the disc incandescent in the case of particularly severe service. Because of the high temperature reached by the disc while braking, the disc deforms and contact between the pads and the braking bands deteriorates. In addition to this the friction material of the pads undergoes a kind of vitrification and contamination by material from the disc.

It has also been found that the highest temperature occurs in a central annular portion of the braking surfaces, that is in a central annular portion of the outer surfaces of the corresponding leaves. In the course of the life of a disc, this zone is readily prone to the formation of cracks.

It is therefore felt particularly keenly in the industry that in order to overcome the abovementioned disadvantages, there is a need to increase efficiency when dispersing the heat generated by braking to contain the temperatures reached by the disc during and after braking.

The problem underlying this invention is that of providing a braking band for a disc for a disc brake of the ventilated type which has structural and functional characteristics which will satisfy the abovementioned requirement and at the same time overcome the disadvantages complained of above in relation to the known art.

This problem has been resolved through a braking band of a disc for a disc brake of the ventilated type according to Claim 1.

Other advantages and characteristics of the present invention will become clear from the following detailed description of preferred embodiments which is given with reference to the appended drawings which are provided purely by way of non-limiting example and in which:

FIG. 1 illustrates a perspective view in partial cross-section of a disc for a disc brake according to this invention, FIG. 2 illustrates a partial plan view, in partial cross-section, of the disc for a disc brake in FIG. 1, FIG. 3 illustrates a magnified detail of the disc in FIG. 2, FIG. 4 illustrates a view of the disc in FIG. 2 in cross-section along the line IV-IV, FIG. 5 illustrates the theoretical results of the temperature distribution in a disc for a disc brake according to the invention, FIG. 6 illustrates the theoretical results for the distribution of air velocities within the ventilation ducts of a disc for a disc brake according to the invention (moving field), FIG. 7 illustrates the theoretical results for the distribution of the initiation of vortices in the ventilation ducts of a disc for a disc brake according to the invention (vortex formation), FIG. 8 illustrates the theoretical results for the distribution of turbulent energy in the ventilation ducts of a disc for a disc brake according to the invention, FIG. 9 illustrates further theoretical results for the temperature distribution in a disc for a disc brake according to this invention.

With reference to the above figures, 10 indicates as a whole a disc for a disc brake of the ventilated type. 12 indicates a hub and 14 indicates a braking band.

In FIG. 4, reference X-X indicates an axis about which the disc rotates. By a direction axial to the disc or the braking band is meant a direction parallel to the X-X axis. Reference r, in FIG. 2, generically indicates a direction radial to the disc or braking band, that is a direction perpendicular to the axial direction or the X-X axis. Finally, a direction tangential or circumferential to the disc means a direction coinciding with a circumference which has its centre on the X-X axis.

Braking band 14 extends between an inner diameter D1, close to the axis of rotation of the disc, X-X, and an outer diameter D2, which is at a distance from the said axis of rotation of the disc, X-X, (FIG. 3).

The braking band comprises two leaves 16 and 18 joined by connection means. According to a possible embodiment the connection means are for example constructed in the form of posts 20. Between the two leaves 16 and 18 there is an intermediate space 22 subdivided into ventilation ducts by the connection means.

Of the two leaves, 16 indicates the one on the same side as the hub, with respect to a median plane 24 of the intermediate space between the two leaves, while 18 indicates that on the side opposite that on which there is the hub, with respect to the said median plane 24 of the intermediate space between the two leaves.

According to a possible embodiment, posts 20 are grouped in three concentric rows comprising an outer row 26, close to the outer diameter D2 of braking band 14, an inner row 28, close to the axis X-X of the disc, and an intermediate row 30 between the inner row and the outer row.

According to a possible embodiment the posts in the inner row 28 and the posts in the intermediate row 30 have a cross-section in a plane substantially parallel to the flow of air along the ventilation ducts which is substantially rhomboidal (FIGS. 2 and 3), in which the apices of the rhombus are rounded.

According to a possible embodiment the posts in outer row 26 have a substantially triangular cross-section in a plane substantially parallel to the flow of air along the ventilation ducts, with a wide base 32 facing the outside of the disc, and sides 34 within the ventilation duct having a concave profile. In other words, when the apices of the substantially triangular cross-section are in the same position, the dimensions of posts according to this invention are smaller than the dimensions of the posts having a triangular cross-section with straight internal sides within the ventilation duct.

According to a possible embodiment, for example in the case of discs having an outer diameter of between 350 and 440 mm, base 32 has a length S of between 14 and 22 mm, preferably 18 mm. In accordance with a further embodiment, for example in the case of discs having an outer diameter between 280 and 350 mm, base 32 has a length S of between 10 and 16 mm, preferably 14 mm.

According to a possible embodiment, sides 34 include at least one length comprising an arc of circumference of radius R. According to a possible embodiment, for example in the case of discs having an outer diameter between 280 and 440 mm, sides 34 comprise at least one length comprising an arc of circumference of radius R of between 36 and 44 mm, preferably 40 mm.

According to a possible embodiment, sides 34 and wide base 32 are connected together by curved lengths. According to a possible embodiment, for example in the case of discs having an outer diameter of between 350 and 440 mm, sides 34 and base 32 are connected by an arc having a circumference of radius r1 of between 2 and 4 mm, preferably 2.5 mm. According to a possible embodiment, for example in the case of discs having an outer diameter of between 280 and 350 mm, sides 34 and base 32 are connected by an arc having a circumference of radius r1 of between 1.5 and 4 mm, preferably 2 mm.

According to a possible embodiment, sides 34 are connected together at the apex within the ventilation ducts by a curved length. According to a possible embodiment, for example in the case of discs having an outer diameter of between 350 and 440 mm, sides 34 are connected together by an arc having a circumference of radius r2 of between 2 and 4 mm, preferably 2.5 mm. According to a possible embodiment, for example in the case of discs having an outer diameter of between 280 and 350 mm, sides 34 are connected together by an arc having a circumference of radius r2 of between 1.5 and 4 mm, preferably 2 mm.

According to a possible embodiment, for example in the case of a disc having an outer diameter of between 350 and 440 mm, posts 20 of inner row 28, if present, have a maximum thickness in a direction tangential to the disc of between 6 and 8 mm, preferably 7 mm. According to a possible embodiment, for example in the case of a disc having an outer diameter of between 280 and 350 mm, posts 20 of inner row 28, if present, have a maximum thickness in a direction tangential to the disc of between 4 and 6 mm, preferably 5 mm.

According to a possible embodiment, for example in the case of a disc having an outer diameter of between 350 and 440 mm, posts 20 in intermediate row 30, if present, have a maximum thickness in a direction tangential to the disc of between 7 and 9 mm, preferably 8 mm. According to a possible embodiment, for example in the case of a disc having an outer diameter of between 280 and 350 mm, posts 20 in intermediate row 30, if present, have a maximum thickness in a direction tangential to the disc of between 6 and 8 mm, preferably 7 mm.

According to a possible embodiment in which at least two rows are present, the rows have the same height L or the same dimensions in a direction radial to the disc. According to another embodiment in which at least two rows are present, the rows do not mutually overlap in a direction radial to the disc. More particularly, each of the rows extends between two circumferences concentric to the disc in which the circumferences bounding the adjacent rows coincide. In other words, with reference to the example illustrated in the figures in which three rows of posts are present, C1 and C2 respectively indicate the circumferences bounding inner row 28, C2 and C3 indicate the circumferences bounding intermediate row 30, and C3 and C4 indicate the circumferences bounding outer row 26. Advantageously circumference C2 bounds both the inner row and the intermediate row while circumference C3 bounds both the intermediate row and the outer row.

According to a possible embodiment, considering an annular portion of the band subdividing the band between the two leaves along median plane 24, for the same percentage ratio between the surface areas of the leaves and the sum of the surface areas s' of the cross-sections of the posts (in general the surface area occupied by the posts is substantially equal to 20-25% of that of the band), the braking band according to this invention has a larger number of posts and therefore a larger total surface area of posts in a direction transverse to the flow of air. Advantageously the number of posts per row in the braking band lies between 35 and 50, even more preferably between 37 and 48.

According to a possible embodiment, on a disc having an outer diameter between 350 and 440 mm, one row includes between 40 and 47 posts, preferably 43 posts. According to a possible embodiment, on a disc of outer diameter of between 280 and 350 mm, one row comprises between 34 and 41 posts, preferably 37 posts.

In the case where there are several rows, it is advantageous that each row should comprise substantially the same number of posts.

According to a possible embodiment incorporating at least two rows, the angular distance $\alpha$ between two adjacent posts in the same row is the same in each row. In the case where three rows are provided, preferably the posts in the outer row are radially aligned with those of the inner row while the posts in the intermediate row are offset with respect to those in the inner and outer rows by approximately half the angular distance $\alpha$ between two adjacent posts in the inner or outer row (FIG. 3).

Advantageously, the ratio between the outer diameter D2 of the braking band, and therefore of the disc, and the maximum thickness of the intermediate space between the two leaves measured in a direction parallel to the X-X axis lies between 15 and 32, preferably between 21 and 25, and even more preferably it is around 23.

Referring below to a disc having an outer diameter of between 350 and 440 mm, According to a possible embodiment leaf 16 located on the side of the hub with respect to median plane 24 of the intermediate space 22 between the two leaves has a thickness of between 10 and 16 mm in a direction axial to the disc. According to a possible embodiment, leaf 18 located opposite the hub with respect to median plane 24 has a thickness of between 10 and 15 mm in a direction axial to the disc. According to another embodiment, intermediate space 22 between the two leaves has a maximum dimension in a direction axial to the disc of between 14 and 20 mm. The two leaves may have thicknesses which are the same or different.

With reference below to a disc of outer diameter of between 280 and 350 mm, according to a possible embodiment leaves 16, 18 have a thickness of between 7 and 10 mm, preferably 8 mm, in a direction axial to the disc. According to a possible further embodiment, intermediate space 22 between the two leaves has a maximum dimension of between 10 and 15 mm, preferably 14 mm, in a direction axial to the disc. The two leaves may have the same or different thicknesses.

From the above it will be seen that the provision of a braking band and a disc for a disc brake according to this invention unusually makes it possible to improve the efficiency of heat exchange, limiting maximum temperatures in the case of identical thermal stresses or making it possible to withstand higher thermal stresses for the same maximum temperatures reached.

The maximum thickness of the intermediate space in a direction parallel to the X-X axis is increased in comparison with known discs, with a result which is particularly advantageous for increasing the cross-section of the ventilation ducts. This is advantageously achieved by reducing the thickness of the leaves and maintaining the axial dimensions of the disc substantially constant.

The distribution, number and shape of the posts, together with the reduction in thickness of the leaves, helps to improve thermal efficiency and reduce the weight of the disc by approximately 10% in comparison with known discs.

The advantageous effects of this invention have been demonstrated in a number of tests carried out on a virtual test bench, the results of which are illustrated in FIGS. 5-8. A flow of air which has a constant velocity at a particular distance from the disc has been simulated in these tests. Both the movement of air and the heat generated during braking have been simulated. The results are particularly useful both for forecasting the behaviour of the disc on a real test bench and for comparing discs of different configurations.

FIG. 6 illustrates the field of motion of the air within the ventilation ducts, that is the distribution of air velocities within the ventilation ducts. The areas indicated by 38 (letter A in FIG. 6) correspond to the preferred air ducts, that is those in which the flow of air has the greatest velocity, while the areas indicated by 40 (letter E in FIG. 6) indicate the areas of air flow which are not effective for the removal of heat, that is the areas in which the flow of air has a lower velocity. These latter areas 40 are also known as "wakes". For completeness, FIG. 6 shows the sequence of points identified by letters from A to E corresponding to areas having different air velocity values as shown by the values indicated.

FIG. 7 illustrates the initiation of vortices within the flow of air along the ventilation ducts. The areas indicated by 42 (letter A in FIG. 7) indicate the initiation of vortices and therefore turbulence along the air flow, in particular against the surfaces of the posts transverse to the flow of air. In FIG. 7 the areas are identified by the letters A-E, and the corresponding values are indicated.

FIG. 8 illustrates the turbulence energy which is generated in the flow of air within the ventilation duct. The areas of greater energy are indicated by the reference 44 (letter A in FIG. 8). In FIG. 8 the areas are identified by letters A-E, and the corresponding values are indicated.

The advantageous provision of wider ventilation ducts in a direction axial to the disc not only makes it possible to increase the amount of air flow but also to accelerate it and direct it in a centrifugal direction.

The effects indicated are further reinforced by the advantageous shape of the outer posts, and the shape and number of posts in the inner and intermediate rows if present.

Figure 6:
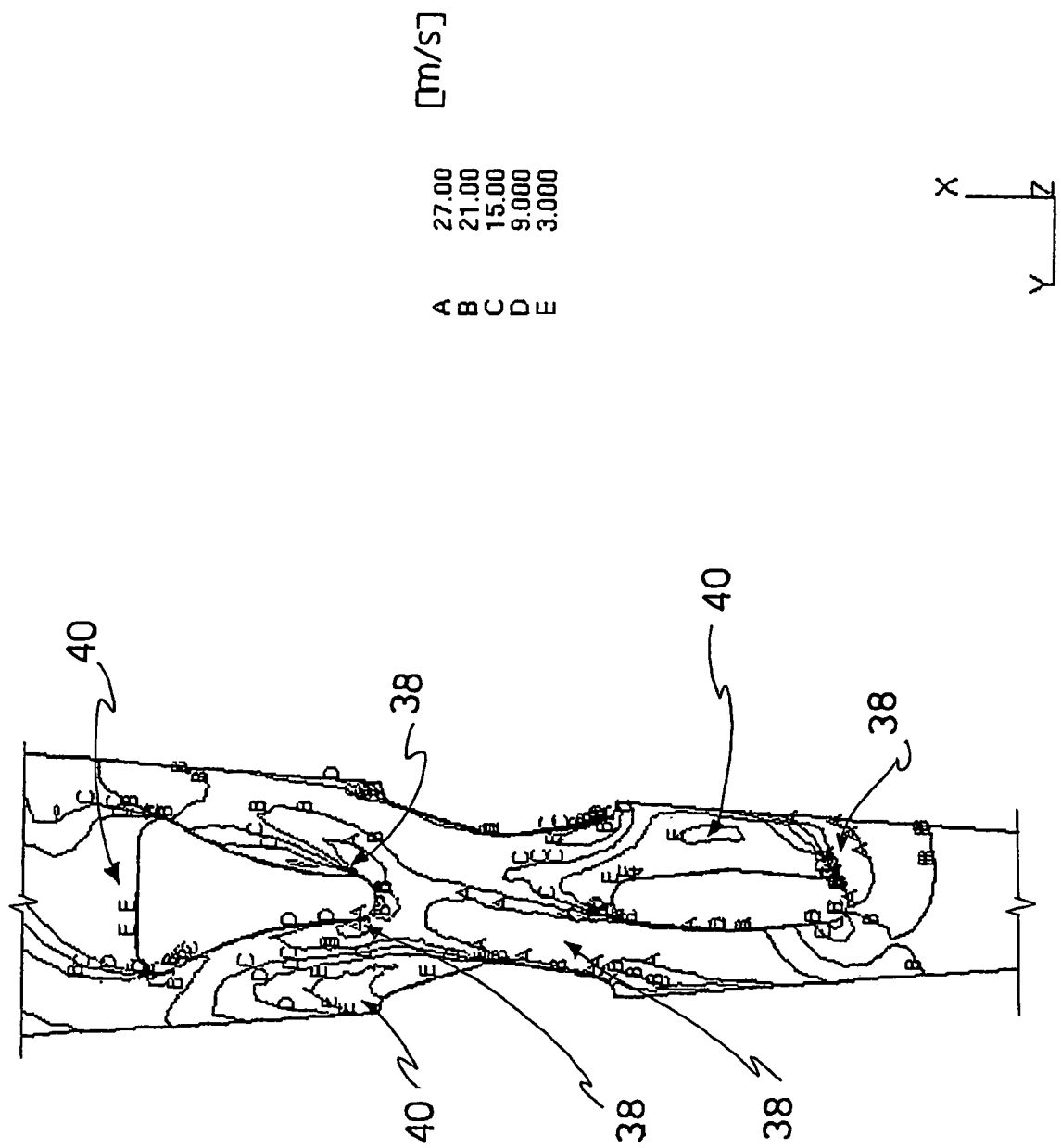

As will be noted in FIG. 6, the air flow is directed in a direction radial to the disc and is appreciably accelerated, also achieving a more regular flow distribution. In fact in the known art areas 38 are highly inclined with respect to a radius of the disc, while in this invention they are substantially radial. In particular, the shape of the outer posts does not impede the outflow of air and instead ducts the flow and accelerates it. Areas 40, or the wakes, that is the areas which are not effective in removing heat, are very much smaller than in the known art.

Figure 7:
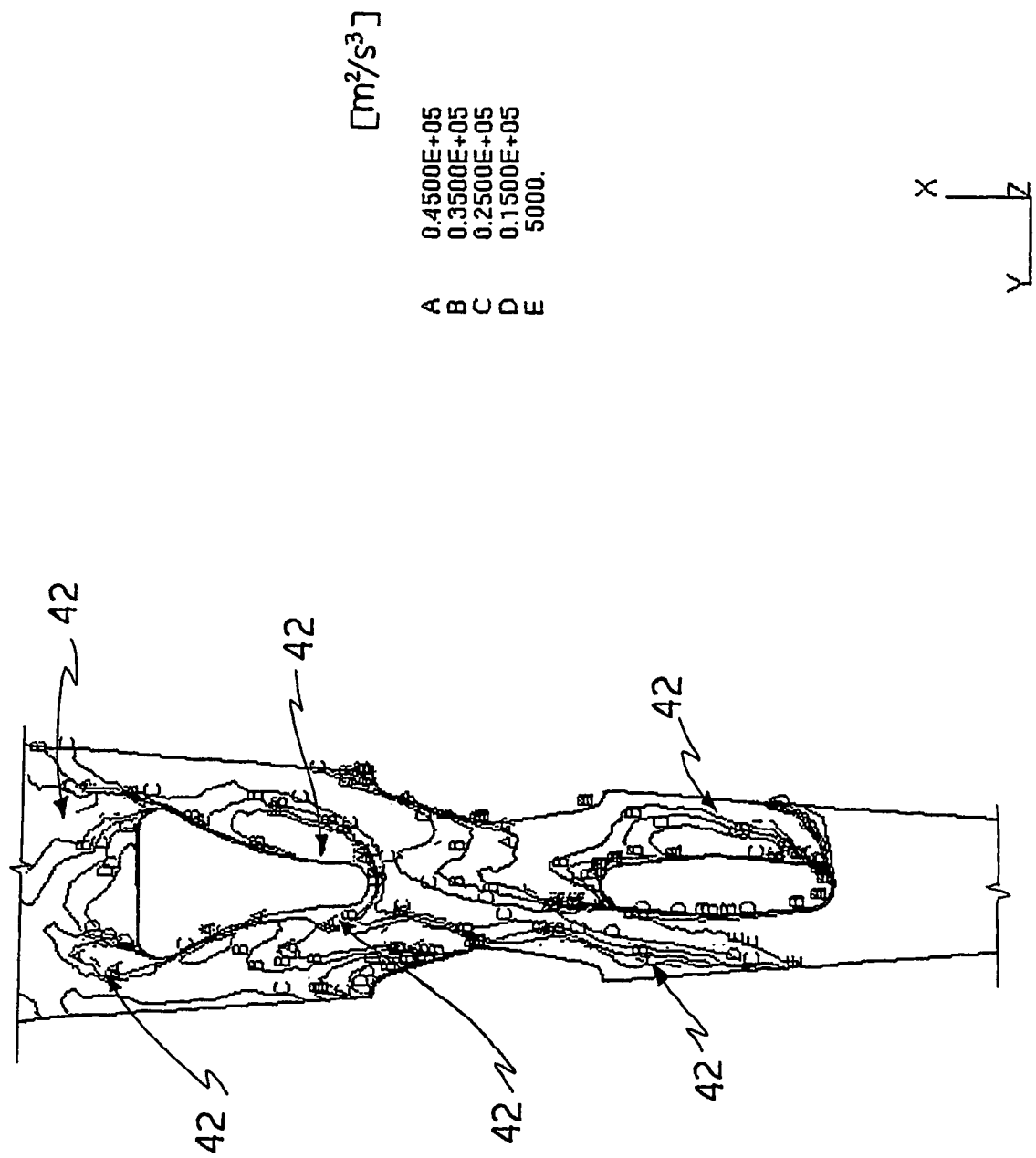

From FIG. 7 it is clear that there are many vortex initiation points widely distributed over the entire surface area of the posts, particularly the outer ones. Elongation of the apices of the outer posts towards the interior of the intermediate space as a result of the concave shape of the corresponding sides helps to increase the surface area which transversely opposes the flow of air allowing the formation of vortices particularly at the apex of the post and throughout the surrounding area.

Figure 8:
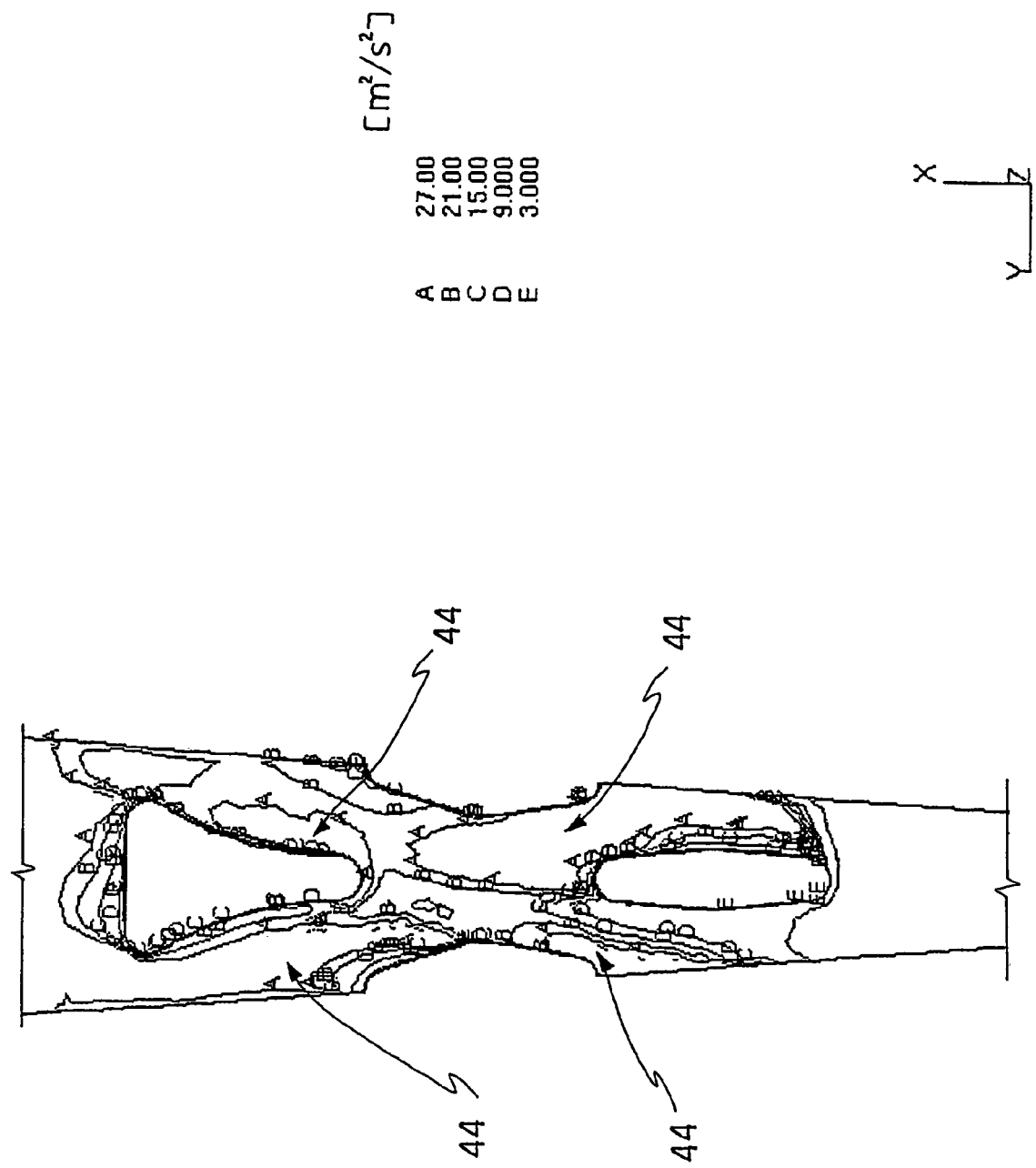

It has also been found that the vortices produced have high energy, particularly at the outer posts, helping to generate a turbulent situation which is particularly effective for removing heat (FIG. 8).

This invention therefore makes it possible to obtain several turbulence initiation points and a greater remixing of the flow of air, helping to increase efficiency in removing the heat generated during braking.

Figure 1:
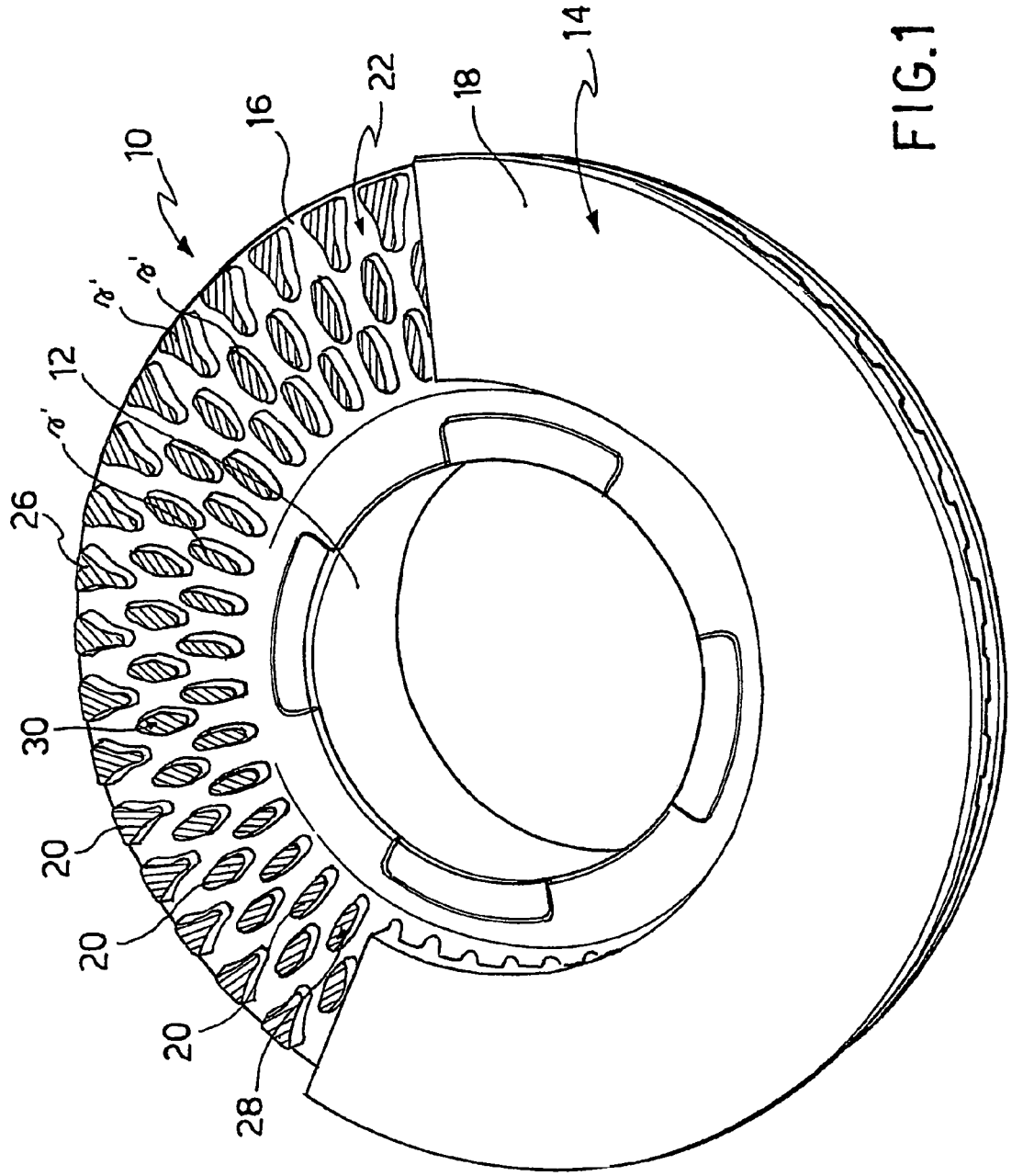
Figure 2:
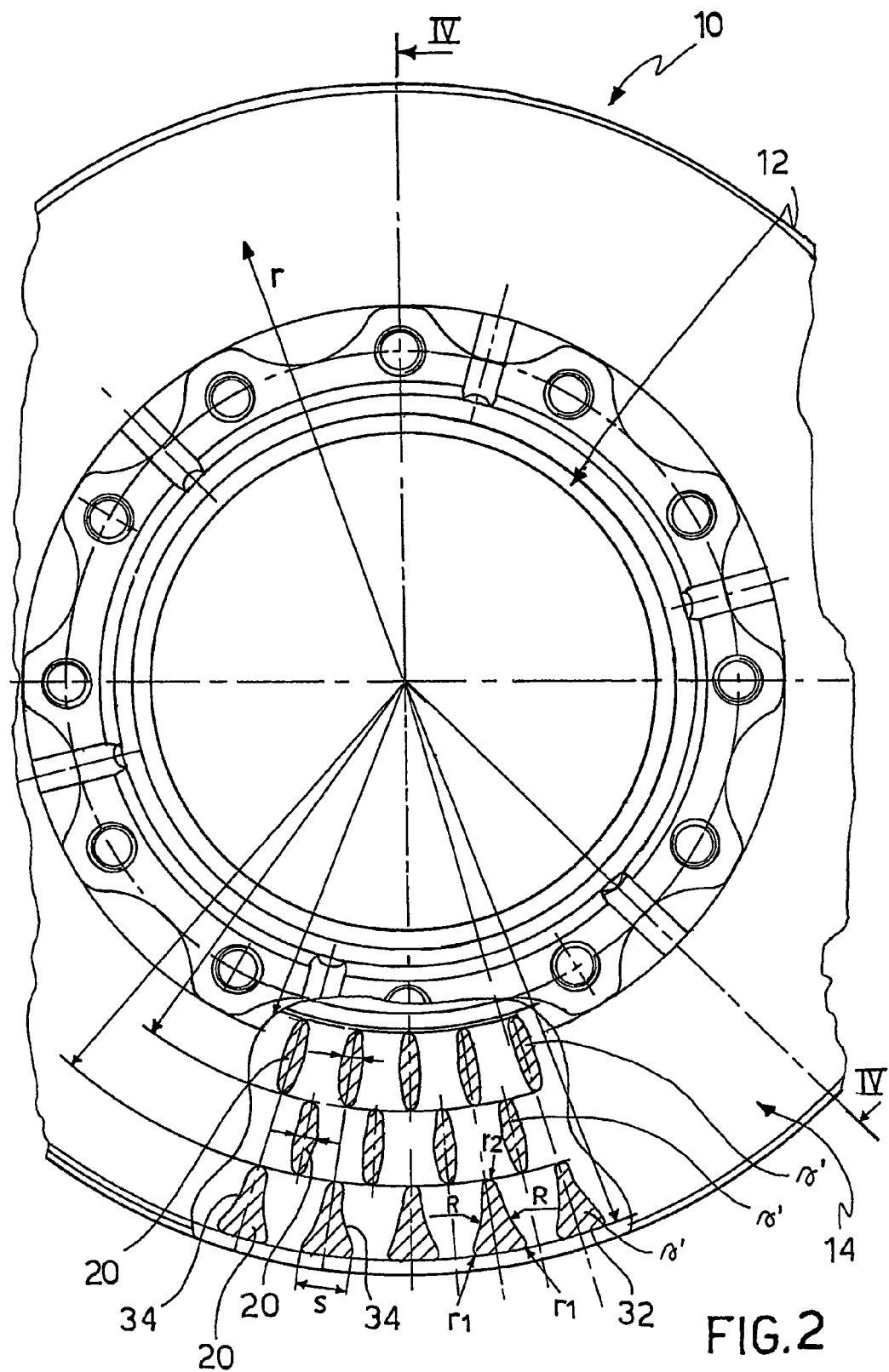
Figure 3:
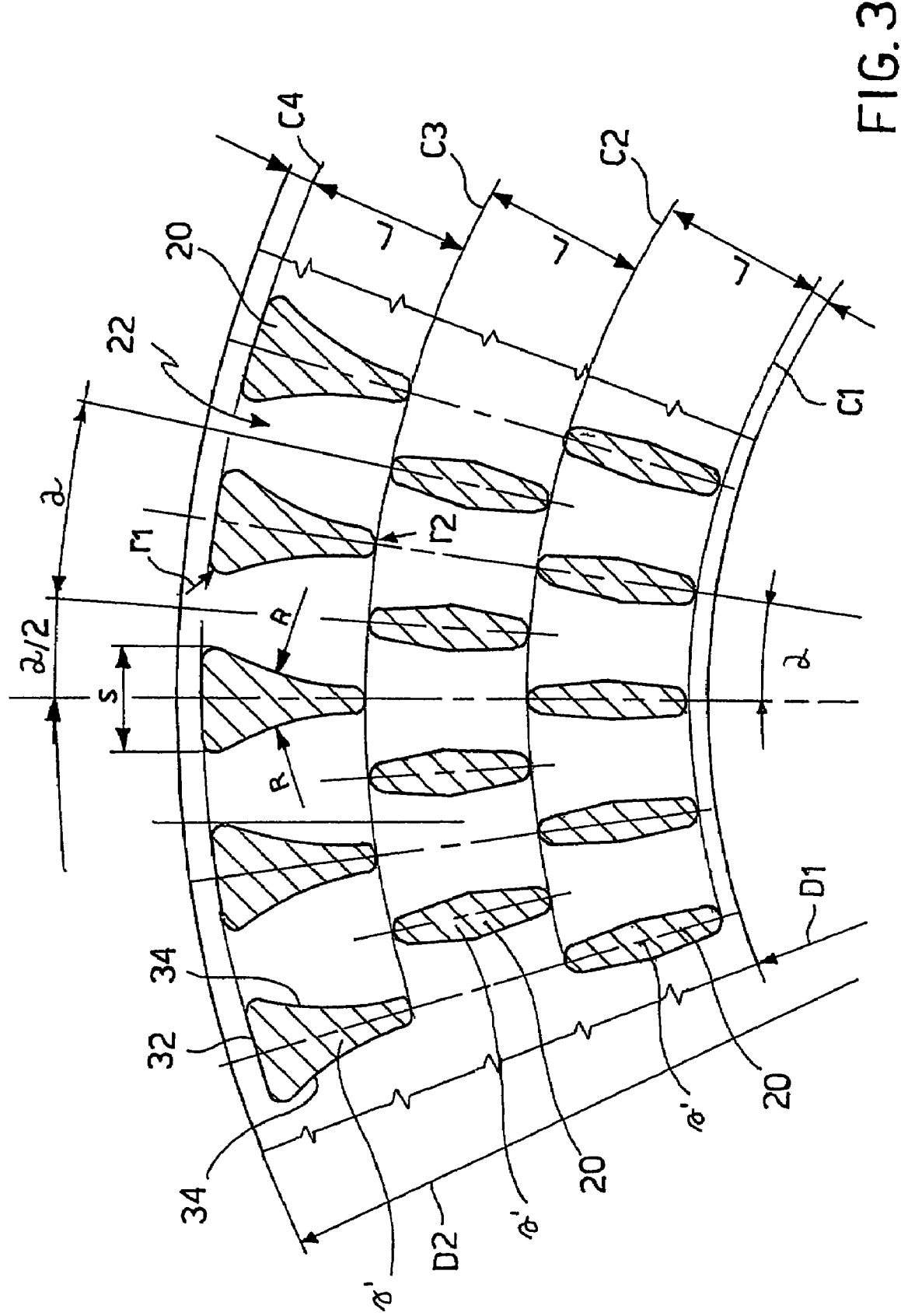
Figure 4:
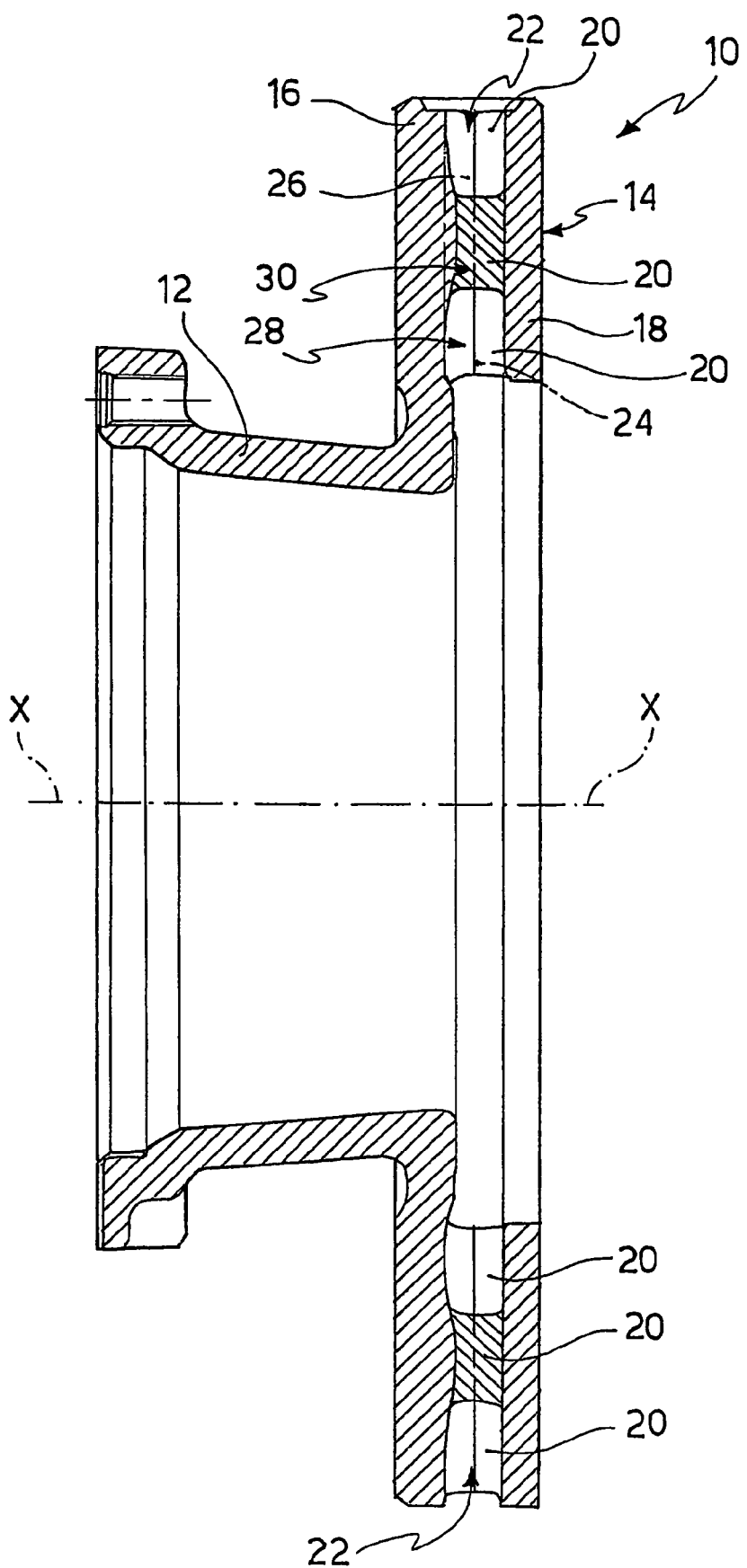
Figure 5:
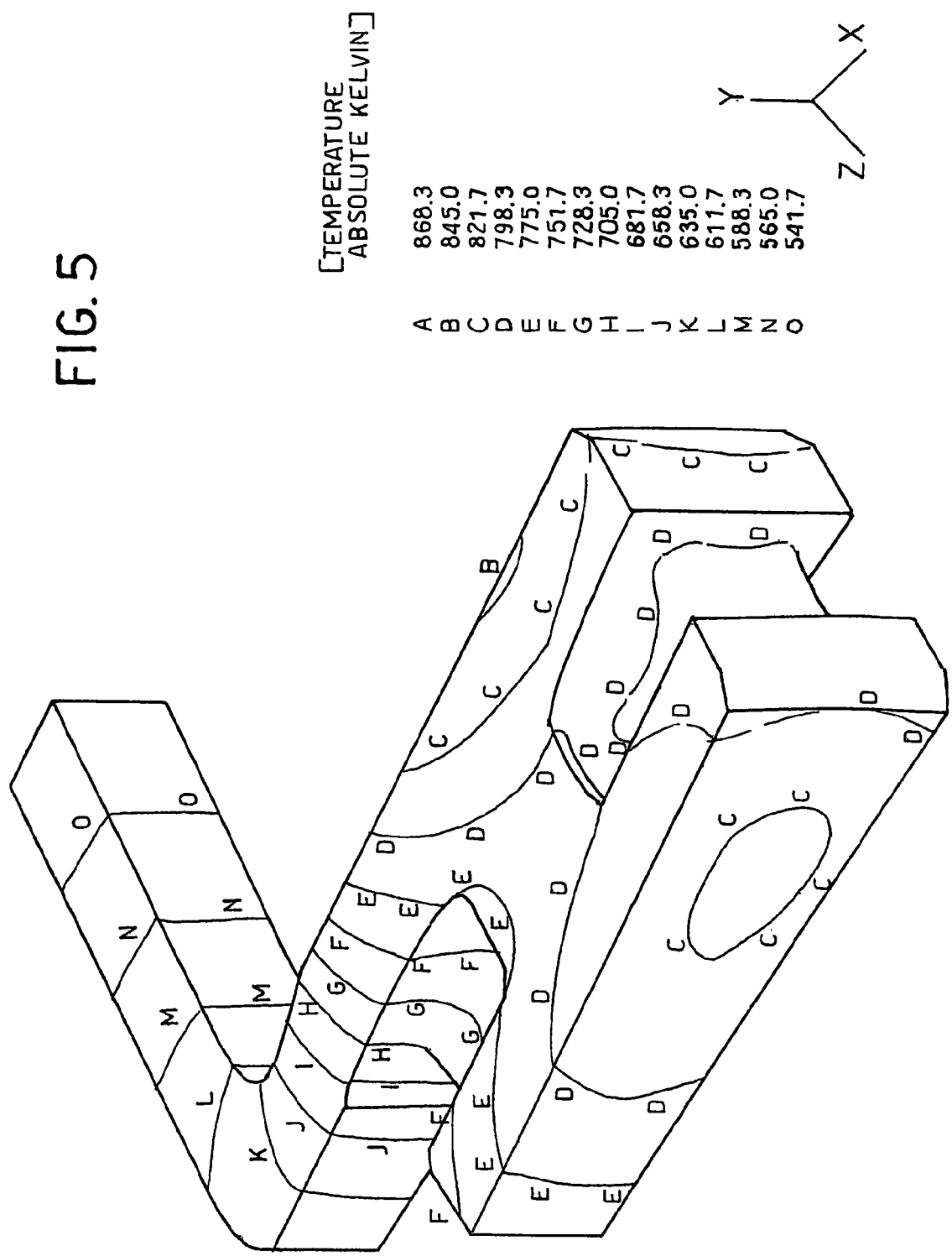
FIG. 5 illustrates the distribution of the temperatures reached by the disc during the simulated braking. The areas are identified by the letters A-O, and the corresponding absolute temperature values (degrees Kelvin) are indicated.

These advantageous aspects are also indicated by the fact that the temperature, and in particular the maximum temperature of the central outer portion of the leaves, for the same thermal stress applied to the disc, is appreciably less than in known discs (FIG. 5). It will be seen from the figure that the maximum absolute temperature reached by the braking band according to the invention is 845° K on the outer portion of the leaf located on the hub side with respect to median plane 24 (821° K on the outer portion of the opposite leaf). Under the same conditions, known braking bands reach 868° K and 845° K respectively.

Figure 9:
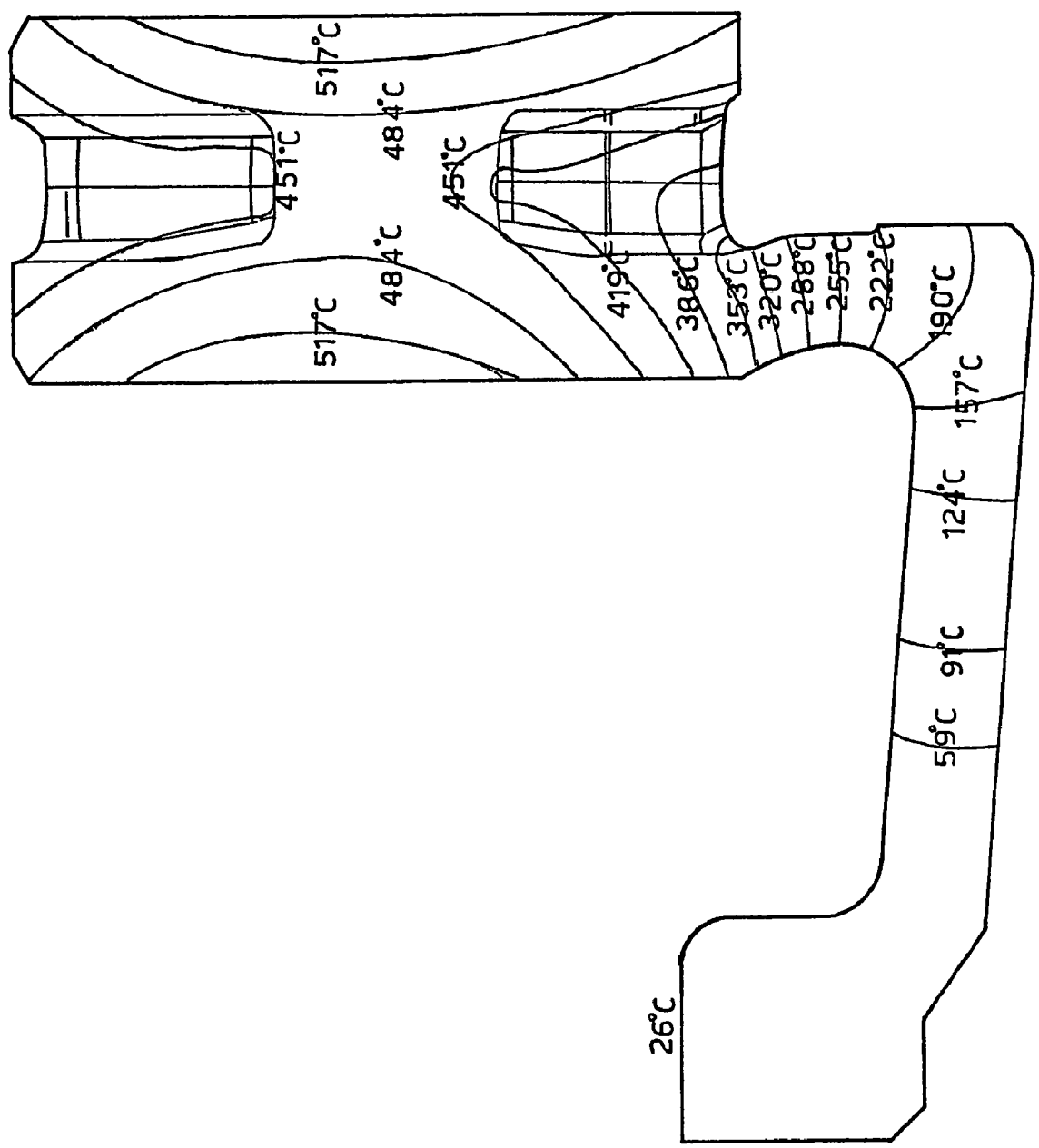
FIG. 9 illustrates the distribution of temperatures reached by the disc following a different test simulation on the virtual bench considering an imaginary heat flow under steady-state conditions for the disc equal to approximately 0.36 W/mm$^2$. The corresponding temperature values are shown on the isotherms illustrated.

It will be noted from the last FIG. 9 that the maximum temperature of a braking band according to this invention is approximately 515° C. for a heat flow of 0.36 W/mm$^2$, while known braking bands have reached 604° C. at the same position. In further confirmation, maintaining the maximum temperature constant, the braking bands according to this invention withstand higher heat flows (approximately 0.42 W/mm$^2$) than those in the known art (0.36 W/mm$^2$).

The braking band according to this invention makes it possible to obtain firstly a decrease in the maximum temperature reached, specifically at the point where cracks appear in the braking band. This makes it possible to eliminate crack formation from the braking surface or to delay it. Secondly the decreased temperature of both the duct and the hub help to limit thermal deformation of the disc, in particular in a direction parallel to the X-X axis of the disc.

As can be appreciated from what has been described, the shape of the posts in the row close to outer diameter D2 helps to further improve the efficiency of heat exchange. In addition to this both the configuration and the layout and distribution of the posts in the inner and intermediate rows, if present, appear to be particularly advantageous.

The provision of a disc which at the same time has posts which thicken, in particular distributed in three rows, and with cross-sections in a plane parallel to the flow of air as described above, is particularly advantageous and synergistic. The thickening of the posts is also of optimum benefit when attempting to reconcile the opposing requirements of increasing the thermal efficiency of the disc, increasing resistance to cracking and avoiding complications in manufacturing of the cast core of the disc or the braking band.

In addition to what has been indicated above, the advantageous shape of the posts in the outer row makes it possible to widen the bases of the same, for the same disc outer diameter and post dimensions, preventing the entry of stones or debris which will clog the air passage. These are in fact discs which are intended to be fitted in particular to means of transport such as motor vehicles or the like which are above all used in inaccessible areas such as for example on sites.

It is clear that variants and/or additions may be made to what has been described and illustrated above.

The connection means between the two leaves may comprise either posts or other embodiments such as fins. In addition to this other cross-sections in the plane parallel to the flow of air along the ventilation ducts or other layouts are possible.

The braking band may be of one piece with the hub or manufactured independently and attached thereto.

Naturally, the principle of the invention remaining the same, the forms of embodiment and details of construction may be varied widely with respect to those described and illustrated, which have been given purely by way of example, without thereby departing from the scope of the invention.

The invention claimed is:

1. A braking band of a disc for a disc brake of the ventilated type, the braking band extending between an inner diameter, close to an axis of rotation of the disc, and having an outer diameter between 280 and 400 mm away from the said axis of rotation of the disc; the braking band comprising two leaves defining an intermediate space and joined by connection means, said connection means being constructed in the form of posts;

said posts being grouped in at least three concentric rows comprising: an outer row, close to the outer diameter of braking band, an inner row close to the axis of the disc, and at least one intermediate row between the inner row and the outer row; the posts in the inner row having a substantially rhomboidal cross-section in a plane parallel to the flow of air along the ventilation ducts with a longer diagonal directed in the radial direction; the posts of the intermediate row having a substantially rhomboidal cross-section in a plane parallel to the flow of air along the ventilation ducts, with the longer diagonal directed in the radial direction;

wherein the outer diameter of the surface, and the thickness or dimension of the intermediate space between the two leaves measured in a direction parallel to the axis of the disc have a ratio between 15 and 32; the posts of the said outer row have a substantially triangular cross-section in a plane substantially parallel to the flow of air along the ventilation ducts with a base facing out from the disc and inner sides within the ventilation duct having a concave profile; said posts of the outer row comprising an arc of radius between 36 and 44 mm; and the braking band comprises 35-50 posts per row.

2. A braking band of a disc for a disc brake of the ventilated type according to claim 1, in which the said ratio preferably lies between 21 and 25.

3. A braking band of a disc for a disc brake of the ventilated type according to claim 1, in which the ratio between the outer diameter of the band and the maximum dimension of the said intermediate space between the two leaves measured in a direction parallel to the axis of the disc is approximately 23.

4. A braking band of a disc for a disc brake of the ventilated type according to claim 1, in which in a disc having an outer diameter of between 350 and 440 mm the leaf located on the hub side with respect to a median plane of an intermediate space between the two leaves has a thickness of between 10 and 16 mm in a direction axial to the disc.

5. A braking band of a disc for a disc brake of the ventilated type according to claim 1, in which in a disc having an outer diameter of between 350 and 440 mm the leaf located on the side opposite the hub with respect to a median plane of an intermediate space between the two leaves has a thickness of between 10 and 15 mm in a direction axial to the disc.

6. A braking band of a disc for a disc brake of the ventilated type according to claim 1, in which in a disc having an outer diameter of between 350 and 440 mm an intermediate space between the two leaves has a maximum dimension of between 14 and 20 mm in a direction axial to the disc.

7. A braking band of a disc for a disc brake of the ventilated type according to claim 1, in which in a disc having an outer diameter of between 280 and 350 mm the leaf on the hub side with respect to a median plane of an intermediate space between the two leaves has a maximum dimension of between 7 and 10 mm, in a direction axial to the disc.

8. A braking band of a disc for a disc brake of the ventilated type according to claim 1, in which in a disc having an outer diameter between 280 and 350 mm the leaf on the side opposite the hub with respect to a median plane of an intermediate space between the two leaves has a thickness of between 7 and 10 mm, preferably 8 mm, in a direction axial to the disc.

9. A braking band of a disc for a disc brake of the ventilated type according to claim 1, in which in a disc having an outer diameter of between 280 and 350 mm an intermediate space between the two leaves has a maximum dimension of between 10 and 15 mm, in a direction axial to the disc.

10. A braking band of a disc for a disc brake of the ventilated type according to claim 1, in which the said connection means comprise posts, at least some of which are grouped into at least one row located close to the outer diameter of the braking band, the said posts of the said at least one row having a substantially triangular cross-section in a plane substantially parallel to the flow of air along the ventilation ducts with a base facing out from the disc and inner sides within the ventilation duct having a concave profile.

11. A braking disc of a disc for a disc brake of the ventilated type according to claim 10, in which the said sides have at least one length comprising an arc of a circumference.

12. A braking band of a disc for a disc brake of the ventilated type according to claim 10, in which the said sides and the said base are connected together with curved lengths.

13. A braking band of a disc for a disc brake of the ventilated type according to claim 10, in which the said posts are grouped into at least two rows comprising at least one outer row, defined by the said at least one row located close to the outer diameter of the braking band, and an inner row close to the axis of the disc, the posts in the said inner row having a substantially rhomboidal cross-section in a plane parallel to the flow of air along the ventilation ducts.

14. A braking band of a disc for a disc brake of the ventilated type according to claim 13, in which the said posts are grouped in at least three rows comprising the said outer row, the said inner row and at least one intermediate row between the said inner row and the said outer row, the posts of the said intermediate row having a substantially rhomboidal cross-section in a plane parallel to the flow of air along the ventilation ducts.

15. A braking band of a disc for a disc brake of the ventilated type according to claim 13, in which the posts in the said inner row have a maximum thickness in a direction tangential to the disc of between 4 and 8 mm in a disc having a diameter of between 280 and 440.

16. A braking band of a disc for a disc brake of the ventilated type according to claim 14, in which the posts in the said intermediate row have a maximum thickness in a direction tangential to the disc of between 6 and 9 mm in a disc having a diameter of between 280 and 440.

17. A braking band of a disc for a disc brake of the ventilated type according to claim 14, in which the said rows have the same height or dimension in a direction radial to the disc.

18. A braking band of a disc for a disc brake of the ventilated type according to claim 14, in which the said rows do not mutually overlap in a direction (r) radial to the disc.

19. A braking band of a disc for a disc brake of the ventilated type according to claim 18, in which each of the said rows extends between two circumferences concentric to the disc, the circumferences which bound the adjacent rows coinciding.

20. A braking band of a disc for a disc brake of the ventilated type according to claim 14, in which one row comprises 35 to 50 posts, preferably from 37 to 48 posts.

21. A braking band of a disc for a disc brake of the ventilated type according to claim 20, in which in a disc having an outer diameter of between 350 and 440 mm one row comprises from 40 to 47 posts.

22. A braking band of a disc for a disc brake of the ventilated type according to claim 21, in which in a disc having an outer diameter of between 350 and 440 mm one row comprises 43 posts.

23. A braking band of a disc for a disc brake of the ventilated type according to claim 20, in which in a disc having an outer diameter of between 280 and 350 mm one row comprises from 34 to 41 posts.

24. A braking band of a disc for a disc brake of the ventilated type according to claim 23, in which in a disc having an outer diameter of between 280 and 350 mm, one row comprises 37 posts.

25. A braking band of a disc for a disc brake of the ventilated type according to claim 20, in which the number of posts is the same in all the rows.

26. A disc for a disc brake of the ventilated type comprising a hub and a braking band in accordance with claim 1.

* * * * *